United States Patent
Mincher et al.

(10) Patent No.: US 11,242,780 B2
(45) Date of Patent: Feb. 8, 2022

(54) ACTUATOR FOR USE IN A SEPARATOR

(71) Applicant: Parker Hannifin EMEA S.à.r.l., Etoy (CH)

(72) Inventors: Adrian Richard Mincher, North Humberside (GB); Carl Joseph Shaw, Brighouse (GB)

(73) Assignee: PARKER HANNIFIN MANUFACTURING (UK) LTD, Hemel Hempstead (GB)

(*) Notice: Subject to any disclaimer, the term of this patent is extended or adjusted under 35 U.S.C. 154(b) by 0 days.

(21) Appl. No.: 16/948,322

(22) Filed: Sep. 14, 2020

(65) Prior Publication Data
US 2020/0408118 A1 Dec. 31, 2020

Related U.S. Application Data

(63) Continuation of application No. PCT/EP2019/061197, filed on May 2, 2019.

(30) Foreign Application Priority Data

May 2, 2018 (GB) ...................................... 1807223
May 2, 2018 (GB) ...................................... 1807224

(51) Int. Cl.
*B01D 45/08* (2006.01)
*F01M 13/00* (2006.01)
(Continued)

(52) U.S. Cl.
CPC ......... *F01M 13/0011* (2013.01); *B01D 45/08* (2013.01); *B01D 45/16* (2013.01);
(Continued)

(58) Field of Classification Search
CPC ......... F01M 13/0011; F01M 2013/026; F01M 2013/0427; F01M 13/023; F01M 13/04;
(Continued)

(56) References Cited

U.S. PATENT DOCUMENTS 4,321,006 A    3/1982  von Ohain
4,466,455 A *  8/1984  Athanassiu ............... F16K 7/18
                                                      137/116.5
(Continued)

FOREIGN PATENT DOCUMENTS

CN    205152164 U    4/2016
CN    107023530 A    8/2017
(Continued)

OTHER PUBLICATIONS

Search Report for GB1807223.1 dated Oct. 29, 2018.
(Continued)

*Primary Examiner* — Dung H Bui
(74) *Attorney, Agent, or Firm* — Christopher H. Hunter

(57) ABSTRACT

An actuator for a separator for separating contaminants from a fluid stream which includes entrained contaminants. The actuator is arranged to move along an actuator axis to adjust an open cross-sectional area of at least one aperture of the separator, and comprises a flexible diaphragm, and a support assembly for the flexible diaphragm. The support assembly is movable along the actuator axis carrying the flexible diaphragm and has an upper support member mounted on a lower support member. A portion of the flexible diaphragm is located between the upper and lower support members. The lower support member comprises an axially extending support portion coupled to a radially extending support portion. The upper support member comprises a diaphragm anti-inversion feature coupled to a radially extending support portion. The diaphragm anti-inversion feature extends such that it axially overlaps at least part of the axially extending support portion of the lower support member.

15 Claims, 6 Drawing Sheets

(51) Int. Cl.
  *F04F 5/18*  (2006.01)
  *B01D 45/16*  (2006.01)
  *B04C 9/00*  (2006.01)
  *F04F 5/10*  (2006.01)
  *F01M 13/04*  (2006.01)

(52) U.S. Cl.
  CPC .............. *B04C 9/00* (2013.01); *F04F 5/10* (2013.01); *F04F 5/18* (2013.01); *B04C 2009/007* (2013.01); *B04C 2009/008* (2013.01); *F01M 13/04* (2013.01); *F01M 2013/0016* (2013.01); *F01M 2013/0433* (2013.01)

(58) Field of Classification Search
  CPC .............. F01M 13/02; F01M 13/00; F01M 2013/0016; F01M 2013/0433; B01D 45/16; B01D 45/08; B04C 9/00; B04C 2009/007; B04C 2009/008; F04F 5/10; F04F 5/18; F04F 5/24; F04F 5/46; F16K 7/00; F16K 7/12; F16K 31/126
  See application file for complete search history.

(56) References Cited

U.S. PATENT DOCUMENTS

| | | | |
|---|---|---|---|
| 4,681,610 A | 7/1987 | Warner | |
| 5,125,428 A | 6/1992 | Rauter | |
| 6,290,139 B1 | 9/2001 | Kolze | |
| 7,243,642 B2 | 7/2007 | Nishikawa | |
| 7,849,841 B2 | 12/2010 | Holzmann | |
| 2005/0211323 A1 | 9/2005 | Dushek | |
| 2006/0086649 A1 | 4/2006 | Wieczorek | |
| 2006/0112941 A1 | 6/2006 | Hilpert | |
| 2009/0314230 A1 | 12/2009 | Nagenkogl | |
| 2009/0321444 A1 | 12/2009 | Rumpf | |
| 2012/0318215 A1 | 12/2012 | Copley | |
| 2014/0033922 A1 | 2/2014 | Peck | |
| 2014/0096841 A1* | 4/2014 | Im | F16K 7/17 137/315.01 |
| 2014/0165977 A1 | 6/2014 | Copley | |
| 2015/0345351 A1* | 12/2015 | Mincher | F01M 13/0011 55/462 |
| 2016/0032798 A1 | 2/2016 | Herman | |
| 2016/0138442 A1 | 5/2016 | An | |
| 2017/0145878 A1 | 5/2017 | Solberg | |
| 2018/0029046 A1 | 2/2018 | Ishida | |
| 2019/0309861 A1* | 10/2019 | Williams | F16K 7/17 |

FOREIGN PATENT DOCUMENTS

| | | | |
|---|---|---|---|
| DE | 10236783 B4 | 12/2008 | |
| DE | 102008022279 A1 | 11/2009 | |
| DE | 1020150208906 A1 | 11/2016 | |
| EP | 1614871 A2 | 7/2005 | |
| JP | 58008883 A * | 1/1983 | ........ F16K 31/126 |
| JP | S6155398 A | 3/1986 | |
| SU | 687268 A1 | 9/1979 | |
| WO | 2011095790 A1 | 8/2011 | |
| WO | 2014155054 A1 | 10/2014 | |

OTHER PUBLICATIONS

International Search Report and Written Opinion for PCT/EP2019/061289 dated Aug. 5, 2019.
Search Report for GB1807224.9 dated Nov. 16, 2018.
International Search Report and Written Opinion for PCT/EP2019/061197 dated Aug. 5, 2019.
International Preliminary Report on Patentability for PCT/EP2019/061197 dated May 11, 2020.
International Preliminary Report on Patentability for PCT/EP2019/061289 dated May 7, 2020.

* cited by examiner

ACTUATOR FOR USE IN A SEPARATOR

FIELD OF THE INVENTION

The present invention relates to an actuator for use in a separator for separating contaminants from a fluid stream which includes entrained contaminants, and to a separator comprising an actuator. In particular, but not exclusively, the present invention relates to an actuator for a separator for separating contaminants from a fluid stream which includes entrained contaminants, the actuator being arranged to move along an actuator axis to adjust an open cross-sectional area of at least one aperture of the separator through which the fluid stream flows, and to a separator comprising such an actuator.

BACKGROUND OF THE INVENTION

Blow-by gas within a reciprocating engine is generated as a by-product of the combustion process. During combustion, some of the mixture of combustion gases escapes past piston rings or other seals and enters the engine crankcase outside of the pistons. The term "blow-by" refers to the fact that the gas has blown past the piston seals. The flow level of blow-by gas is dependent upon several factors, for example the engine displacement, the effectiveness of the piston cylinder seals and the power output of the engine. Blow-by gas typically has the following components: oil (as both a liquid and an aerosol, with aerosol droplets in the range 0.1 μm to 10 μm), soot particles, nitrous oxides (NOx), hydrocarbons and other organic species, carbon monoxide, carbon dioxide, oxygen, water, and other gaseous air components.

If blow-by gas is retained within a crankcase with no outlet, the pressure within the crankcase rises until the pressure is relieved by leakage of crankcase oil elsewhere within the engine, for example at the crankcase seals, dipstick seals or turbocharger seals. Such a leak may result in damage to the engine.

In order to prevent such damage, and excessive loss of oil, it is known to provide an outlet valve that allows the blow-by gas to be vented to the atmosphere. However, with increasing environmental awareness generally, and within the motor industry in particular, it is becoming unacceptable to allow blow-by gas to be vented to atmosphere due to the discharge of oil and other contaminants from within the crankcase. Furthermore, such venting increases the speed at which crankcase oil is consumed.

Consequently, it is known to filter the blow-by gas. The filtered blow-by gas may then either be vented to the atmosphere as before (in an open loop system), or it may be returned to an air inlet of the engine (in a closed loop system). The blow-by gas may pass through a filtering medium or another known form of gas contaminant separator. The conventional arrangement of an engine blow-by gas/oil separator returning cleaned gas to an engine air intake is commonly referred to as a Closed Crankcase Ventilation (CCV) system.

The filtering of engine blow-by gas using impaction separators which remove contaminants (particularly oil aerosols) from the gas is well known. Typically, separators are fitted downstream of the gases being vented from the engine crankcase, with oil that is separated from the blow-by gasses returned to the engine sump via a drain hose.

As mentioned above, it is necessary to avoid unacceptably high engine crankcase pressures, in order to avoid oil leakage. To this end, the separator must be arranged so that a flow pressure differential across the separator is below an allowable limit set by the engine manufacturer. Typically, an upper limit of between around 5 mbar and 50 mbar is set. The blow-by gas which has been 'cleaned' by the separator is returned to the air intake of the engine. In this way, it is ensured that no oil aerosols that may remain after separation are vented to atmosphere. In some countries, this is a specific requirement of relevant emissions legislation. For closed crankcase ventilation systems, the separation performance of the separator, and the prevention of oil mist contaminating the turbo compressor wheel, are fundamental, measured technical requirements.

The maximum gravimetric efficiency of a separator having a pressure differential within the range defined by either open or CCV systems have been measured and are known in the industry. Generally, 70%-80% of oil aerosols can be removed by mass. Utilising state of the art equipment, the fractional efficiency (i.e. the separation performance at any given particle size) can be measured to particle sizes as small as 0.03 μm. The particle challenge characteristics of the engine can similarly be measured. With engine distribution data and high-resolution fractional efficiency data, the gravimetric efficiency of a separator can now be accurately predicted. In the course of several years of research the previously accepted performance limits of impaction separators for blow-by emissions control have been exceeded. Efficiency levels of 98% and higher have been achieved.

International Patent Publication No. WO-2014/155054 discloses a prior separator in which contaminated engine crankcase blow-by gases entering a first chamber are separated from a second chamber by a rolling diaphragm forming a radial seal at the interface between the chambers. The first chamber has approximately the same pressure as the engine crankcase, while the second chamber references atmosphere. Blow-by gas enters a third chamber by passing through an acceleration aperture. Impaction and separation of oil particles due to radial acceleration occurs both on the diaphragm face, and on the surface of an annular coalescer material inserted opposite the outlet of the acceleration aperture. This material improves the co-efficient of restitution of oil droplets on an impaction wall of the separator, rather than acting as a pass-through media.

A jet pump is connected downstream of the third chamber, to create pressure lift. The jet pump is powered via air bleed from a turbocharger of the engine, and thus synergy is used to create pressure lift. The developed pressure lift is used to enhance the performance of the inertial separator. By subjecting the third chamber to a vacuum, the pressure in the first chamber will consequentially be reduced. The diaphragm in the first chamber will then respond to occlude the aperture and, whilst the diaphragm is referenced to atmosphere, the pressure in the first chamber will be stabilised relative to atmosphere. This relationship then maintains near atmospheric pressure in the first chamber and creates a pressure drop across the impaction system. This pressure drop is directly related to the separation efficiency of the separator.

The diaphragm, in a natural or 'home' state, has a generally 'top-hat' shape, comprising: a central/upper radially extending portion; a convoluted portion which extends in a first axial direction away from the radially extending portion and which is then folded back on itself so that it extends in the opposite axial direction to define a convolute; and an outer lip or brim. The central radially extending portion is seated on a support which forms part of an actuator that is movable along an actuator axis so that the diaphragm progressively occludes the acceleration aperture. The outer lip or brim is secured to a housing of the separator.

Unexpected pressure increases and random high flow events can cause the diaphragm to travel to an uppermost position (which may correspond to its home state). It has been recognised that this presents a risk of the diaphragm convolute being blown or turned inside out, so that the diaphragm becomes inverted. In that situation, the diaphragm could become stuck in the inverted position, so that it would not recover into its home state. This would result in upstream pressure control of the diaphragm becoming unresponsive, leading to excessive levels of low pressure, which could potentially damage engine seals.

It will be understood that it is desirable to reduce the risk of diaphragm inversion occurring.

SUMMARY OF THE INVENTION

According to a first aspect of the present invention, there is provided an actuator for a separator for separating contaminants from a fluid stream which includes entrained contaminants, the actuator being arranged to move along an actuator axis to adjust an open cross-sectional area of at least one aperture of the separator through which the fluid stream flows and comprising:

a. a flexible diaphragm for occluding the at least one aperture; and b. a support assembly for the flexible diaphragm, the support assembly being movable along the actuator axis carrying the flexible diaphragm and comprising a lower support member and an upper support member mounted on the lower support member so that a portion of the flexible diaphragm is located between the upper and lower support members;

c. in which the lower support member comprises a radially extending support portion and an axially extending support portion coupled to the radially extending support portion;

d. and in which the upper support member comprises a radially extending support portion and a diaphragm anti-inversion feature coupled to the radially extending support portion, the diaphragm anti-inversion feature extending in an axial direction so that it axially overlaps at least part of the axially extending support portion of the lower support member.

According to a second aspect of the present invention, there is provided a separator for separating contaminants from a fluid stream which includes entrained contaminants, comprising:

a. a chamber having an inlet through which a fluid stream enters the chamber, to flow axially along the chamber;

b. an impaction surface located downstream of the chamber, which is arranged to deflect the fluid stream after the fluid stream leaves the chamber such that contaminants are separated from the fluid stream;

c. a dividing wall which separates the chamber from the impaction surface, the dividing wall having at least one aperture formed in it through which the fluid stream can pass out of the chamber towards the impaction surface; and d. an actuator which is arranged to move along an actuator axis to adjust an open cross-sectional area of the at least one aperture in the dividing wall according to a pressure differential between fluid pressure in the chamber and a pressure reference by moving along the dividing wall so as progressively to occlude the at least one aperture;

e. in which the actuator comprises a flexible diaphragm for occluding the at least one aperture and a support assembly for the flexible diaphragm, the support assembly being movable along the actuator axis carrying the flexible diaphragm and comprising a lower support member and an upper support member mounted on the lower support member so that a portion of the flexible diaphragm is located between the upper and lower support members;

f. in which the lower support member comprises a radially extending support portion and an axially extending support portion coupled to the radially extending support portion;

g. and in which the upper support member comprises a radially extending support portion and a diaphragm anti-inversion feature coupled to the radially extending support portion, the diaphragm anti-inversion feature extending in an axial direction so that it axially overlaps at least part of the axially extending support portion of the lower support member.

The contaminants may be liquid, aerosol and/or particulate contaminants.

The anti-inversion feature may act to prevent the flexible diaphragm from inverting in the event that the separator experiences an unexpected pressure increase and/or in the event of a random high flow event occurring. Inversion of the diaphragm may involve the seal moving away from a home position or state. Inversion of the diaphragm may involve a convolute/convoluted portion of the diaphragm turning inside-out. The anti-inversion feature may present a physical barrier to inverting movement of the diaphragm. The anti-inversion feature may also act to fix a natural pivot point of the diaphragm (relative to the support assembly) to a location on the axially extending portion of the lower support member, rather than at a location on the radially extending portion of the lower support member. This may help to resist diaphragm inversion.

The lower support member may take the form of a lower cap. The upper support member may take the form of an upper cap. The support assembly may define a piston which is movable along the actuator axis under applied fluid pressure. The piston may be movable according to a pressure differential across the flexible diaphragm. The piston may be formed by the lower and upper support members, when the upper support member is mounted on the lower support member. The piston may be hollow, may be generally annular, and may take the form of a generally cylindrical tubular.

Reference is made to upper and lower support members. The upper support member is mounted on the lower support member, with the anti-inversion feature of the upper support member extending in an axial direction so that it axially overlaps at least part of the axially extending support portion of the lower support member. The upper support member may therefore be considered to be mounted over or on top of the lower support member, and references to the upper and lower support member should be interpreted accordingly. The references to upper and lower support members should not necessarily be taken as implying a particular orientation of the support members during use, for example that the upper support member is located vertically above the lower support member. Typically, however, the separator will be arranged in this way, so that the fluid stream/contaminants flow downwardly (under the action of gravity) following the separation of contaminants from the fluid stream.

The lower support member may be a one-piece member. The upper support member may be a one-piece member. The lower and upper support members will typically be provided as separate components. However, the support members can conceivably be provided as a single component, for example by a suitable moulding process.

The radially extending portion of the lower support member may extend generally radially outwardly from the actuator axis. At least part of the radially extending portion may be disposed in or parallel to a plane, the plane being parallel to/containing a radius extending from the actuator axis. It will be understood, however, that at least part of the radially extending portion may be disposed at a non-parallel angle relative to the radial plane. Reference to the radially extending portion of the lower support member should be interpreted accordingly. The radially extending portion may be disposed transverse to the actuator axis and may be disposed substantially perpendicularly to the actuator axis.

The axially extending portion of the lower support member may extend generally axially, relative to the actuator axis. At least part of the axially extending portion may be disposed parallel to the actuator axis. It will be understood, however, that at least part of the axially extending portion may be disposed at a non-parallel angle relative to the actuator axis. References to the axially extending portion of the lower support member should be interpreted accordingly.

The axially extending portion of the lower support member may comprise a transition portion by which the axially extending portion is coupled to the radially extending portion. The transition portion may have a rounded or curved profile. This may provide a smooth transition between the radially extending portion and the axially extending portion, reducing a risk of damage to the flexible diaphragm during use through contact with the lower support member, at an intersection between the radial and axial portions. At least an upper or outer surface of the transition portion may be rounded or curved. The transition portion may be rounded/curved in longitudinal cross-section, which may be taken in a plane containing the actuator axis.

The radially extending portion of the upper support member may extend generally radially outwardly from the actuator axis. At least part of the radially extending portion may be disposed in or parallel to a plane, the plane being parallel to/containing a radius extending from the actuator axis. It will be understood, however, that at least part of the radially extending portion may be disposed at a non-parallel angle relative to the radial plane. Reference to the radially extending portion of the upper support member should be interpreted accordingly. The radially extending portion may be disposed transverse to the actuator axis and may be disposed substantially perpendicularly to the actuator axis.

The diaphragm anti-inversion feature may extend generally in an axial direction relative to the actuator axis. A part or parts of the diaphragm anti-inversion feature may be disposed parallel to the actuator axis. At least part of the diaphragm anti-inversion feature may be disposed at a non-parallel angle relative to the actuator axis. References to the diaphragm anti-inversion feature extending in an axial direction should be interpreted accordingly.

The anti-inversion feature may extend in the axial direction out of a plane in which the radially extending portion is disposed or contained. The anti-inversion feature may extend in an axial direction towards the lower support member, which may be a generally downward direction. The reference to the anti-inversion feature extending downward should be interpreted bearing in mind the discussion of 'upper' and 'lower' support members set out above. The anti-inversion feature may comprise a lower or inner surface, which may be a radially inner surface. The surface may have a rounded or curved profile. The surface may be rounded/curved in longitudinal cross-section, which may be taken in a plane containing the actuator axis. The profile may substantially match the profile of the transition portion. The surface may have substantially the same curvature as the transition portion, which may be a radius of curvature. The anti-inversion feature may comprise a radially outer surface, which may be disposed substantially parallel to the actuator axis. An intersection between the inner surface and the outer surface of the anti-inversion feature may have a rounded or curved profile. This may provide a smooth transition between the inner surface and the outer surface, reducing a risk of damage to the flexible diaphragm during use.

The anti-inversion feature may extend over and/or may cover at least part of the transition portion of the lower support member. The dividing wall may describe a radially inner diameter. The upper support member may describe a maximum radially outer diameter of the support assembly, which may be less than the radially inner diameter described by the dividing wall. A gap may therefore be defined between the dividing wall and the upper support member, which may help to avoid contact between the upper support member and a portion of the flexible diaphragm in contact with the dividing wall, during movement of the support assembly.

The anti-inversion feature may be a lip, rib, protrusion or the like. The anti-inversion feature may be provided at, or may define, a radially outer end or extent of the upper support member. The anti-inversion feature may form an outer brim or rim of the upper support member.

Reference is made to the anti-inversion feature axially overlapping at least part of the axially extending support portion of the lower support member. The anti-inversion feature may overlap in that it may extend in an axial direction over part of the axially extending support portion of the lower support member. The anti-inversion feature may axially overlap at least an upper end of the axially extending support portion of the lower support member. The anti-inversion feature may be arranged so that it overlaps the radially outwardly extending portion of the flexible diaphragm in a radial direction. This may help to prevent unmounting or unseating of the diaphragm during use.

The axially extending portion of the lower support member may be arranged to support a lower or inner surface of the flexible diaphragm during use, as the actuator moves along the actuator axis. The lower or inner surface of the diaphragm may face or open on to the chamber.

The lower support member may define a support surface for contacting and supporting the flexible diaphragm. The upper support member may define a support surface for contacting and supporting the diaphragm. The portion of the diaphragm located between the upper and lower seal support members may be clamped between the respective support surfaces. This may be achieved by arranging the upper and lower support members so that they exert a clamping force on said diaphragm portion when the upper support member is mounted to the lower support member. The support surface of the lower support member may be defined by the radially extending portion and the axially extending portion. The support surface of the upper support member may be defined by the radially extending portion and the anti-inversion feature, in particular the inner/lower surface of the anti-inversion feature. The upper support member may be mounted on the lower support member by a connector which is arranged to exert a clamping force on the upper support member to secure it to the lower support member. The connector may be arranged to exert a clamping force on the portion of the flexible diaphragm located between the support members.

The separator may comprise a diaphragm anti-inversion member located radially outwardly of the actuator and extending in direction along the actuator axis, to define a barrier for resisting inversion of the flexible diaphragm. The anti-inversion member may be disposed in a second chamber which references atmospheric pressure. The anti-inversion member may limit the space available for the diaphragm to invert into the second chamber, and/or to balloon out. The anti-inversion member may describe a radially inner diameter. The actuator, in particular the upper support member, may describe a radially outer diameter, which may be less than the radially inner diameter of the anti-inversion member, so that a gap is defined between the anti-inversion member and the upper support member. This may help to avoid contact between the upper support member and the anti-inversion member during movement of the support assembly. The anti-inversion member may be generally radially aligned with the dividing wall of the actuator.

The anti-inversion member may define a barrier surface facing towards the flexible diaphragm, which may restrict inversion of the diaphragm. The anti-inversion member may define a substantially continuous barrier surface, which may extend around at least part of a perimeter (which may be a circumference) of the actuator assembly, suitably around an entire perimeter. The anti-inversion member may be generally annular in shape and may have a cylindrical tubular shape. The anti-inversion member may take the form of a rib. The separator may comprise a plurality of anti-inversion members which together define the barrier surface. The anti-inversion members may take the form of fingers or other protrusions. The anti-inversion member may have an axial end, which end may be rounded or curved. This may reduce a risk of damage to the diaphragm during use.

The portion of the flexible diaphragm which is located between the upper and lower support members may be sealed relative to the support members. The portion may be a radially inwardly extending portion of the diaphragm, which may be a central portion.

The flexible diaphragm may have a natural (or 'home') state. In the home state, the flexible diaphragm may have a generally 'top-hat' shape, which may comprise: a radially extending portion (which may be an inner or central portion of the diaphragm); a convoluted portion which extends in a first axial direction away from the radially extending portion and is then folded back on itself so that it extends in a second (opposite) axial direction to define a convolute; and a radially outer portion, which may be a lip or brim. The radially extending portion may be seated on the lower support member of the actuator that is movable along an actuator axis, so that the diaphragm progressively occludes the acceleration aperture. The radially outer portion may be secured to a housing of the separator. A portion of the diaphragm located between the radially extending support portion and the radially outer portion (which may be the convolute) may serve for occluding the at least one aperture. The diaphragm may be arranged progressively to fold and to unfold so as respectively to uncover and to cover the at least one aperture. The position of the diaphragm may be determined by the pressure differential between fluid in the chamber and the pressure reference. The pressure differential across the diaphragm may provide the sealing pressure between the diaphragm and the dividing wall. The flexible diaphragm may be a flexible tubular membrane, which term may be used interchangeably with the term 'flexible diaphragm'. The flexible diaphragm may be a rolling diaphragm.

The actuator may be movable between a fully open position (which may be an upper position) in which the flexible diaphragm provides a minimum occlusion of the at least one aperture and a fully closed position (which may be a lower position) in which the diaphragm provides a maximum occlusion of the at least one aperture. The diaphragm may be configured so that the at least one aperture is not occluded when it is in its fully open position. The diaphragm may be configured to completely occlude the at least one aperture in its fully closed position. Occlusion of the at least one aperture may involve restricting an effective flow area of the aperture.

The separator may comprise a plurality of apertures. Each aperture may be at least one of circumferentially spaced around and axially spaced along the dividing wall from at least one other aperture.

The dividing wall may have a cylindrical tubular shape. The chamber may be defined by the dividing wall. The cylindrical tubular shape of the dividing wall may have a circular cross-section.

According to a third aspect of the present invention, there is provided a separator for separating contaminants from a fluid stream which includes entrained contaminants, comprising:

a. a chamber having an inlet through which a fluid stream enters the chamber, to flow axially along the chamber;
b. an impaction surface located downstream of the chamber, which is arranged to deflect the fluid stream after the fluid stream leaves the chamber such that contaminants are separated from the fluid stream;
c. a dividing wall which separates the chamber from the impaction surface, the dividing wall having at least one aperture formed in it through which the fluid stream can pass out of the chamber towards the impaction surface;
d. an actuator which is arranged to move along an actuator axis to adjust an open cross-sectional area of the at least one aperture in the dividing wall according to a pressure differential between fluid pressure in the chamber and a pressure reference by moving along the dividing wall so as progressively to occlude the at least one aperture, the actuator comprising a flexible diaphragm for occluding the at least one aperture; and
e. a diaphragm anti-inversion member located radially outwardly of the actuator and extending in a direction along the actuator axis, to define a barrier for restricting inversion of the flexible diaphragm.

Further features of the separator of the third aspect of the invention may be derived from the text set out elsewhere in this document, particularly the text relating to the actuator of the first aspect of the invention and/or the separator of the second aspect of the invention. In particular, further features of the diaphragm anti-inversion member forming part of the separator of the third aspect of the invention may be derived from the text set out with reference to the actuator of the first aspect of the invention and the separator of the second aspect of the invention.

In another aspect of the present invention, there is provided a crankcase ventilation system comprising the separator of the second or third aspects of the invention.

DETAILED DESCRIPTION OF THE INVENTION

Figure 1:
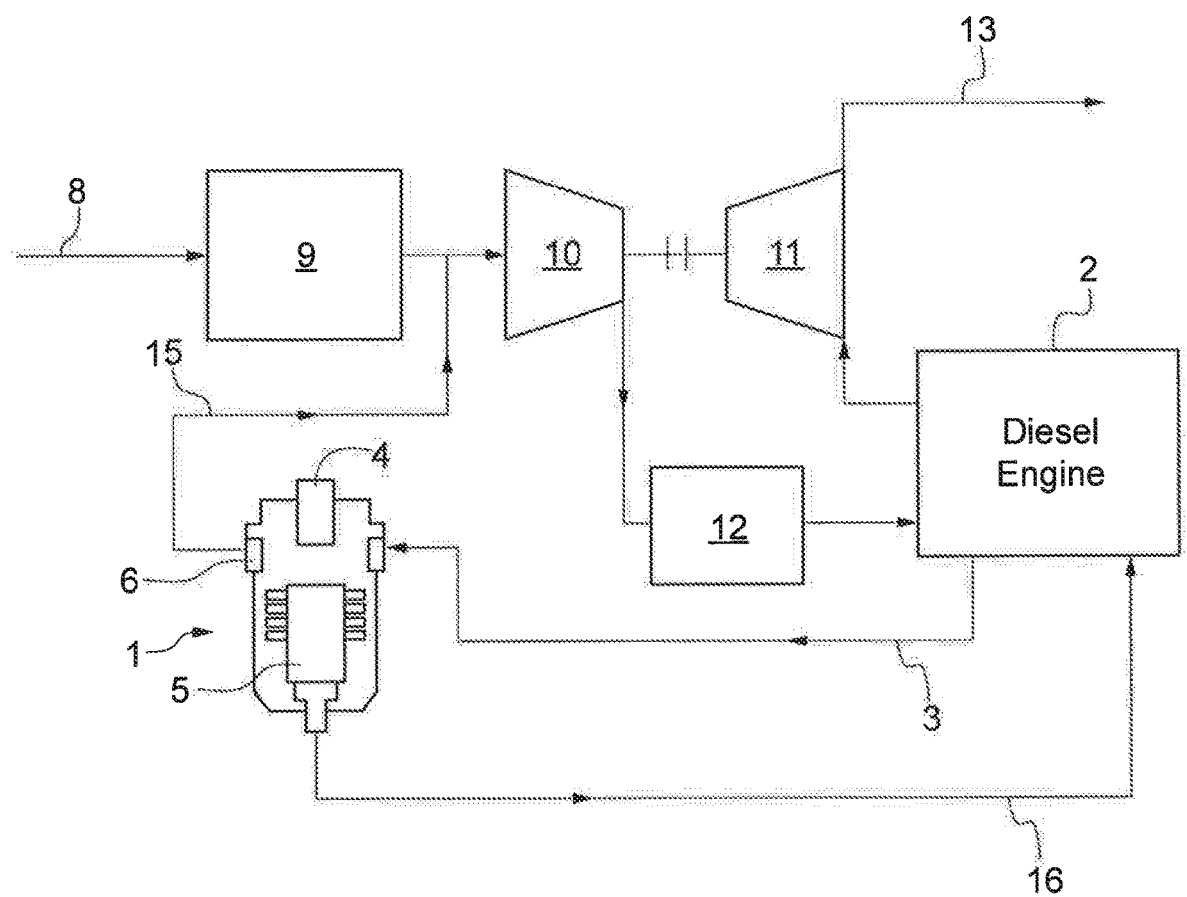
FIG. 1 is a schematic illustration of an engine system including a closed crank ventilation (CCV) system.

An embodiment of the present invention will now be described, by way of example only, with reference to the accompanying drawings. FIG. 1 illustrates schematically the arrangement of a CCV system 1 coupled to a diesel engine 2. Blow-by gas from the engine crankcase passes to the CCV system 1 along inlet duct 3. The CCV system 1 comprises a regulator 4 coupled to the inlet duct 3 and a contaminant separator 5 in series. The regulator 4 and separator 5 are shown combined in FIG. 1.

A pump 6 is provided within the CCV system 1 to increase the pressure drop across the separator 5, thereby increasing the filtering efficiency. Cleaned blow-by gas exits the CCV system 1 through gas outlet 15 and is returned to the engine air intake system. Specifically, the engine air intake system draws in air from outside of the vehicle through an inlet 8, the air then passing through an inlet air filter and silencer 9, a compressor 10 driven by a turbocharger 11 (in turn driven by the engine exhaust 13) and an after cooler 12 to cool the compressed air before it is supplied to the engine 2. The cleaned blow-by gas passes from the gas outlet 15 to the compressor 10. Oil and other contaminants separated from the blow-by gas are returned to the engine crankcase through an oil drain 16.

The present invention provides an actuator for a separator for separating contaminants from a fluid stream which includes entrained contaminants, the actuator being arranged to move along an actuator axis to adjust an open cross-sectional area of at least one aperture of the separator through which the fluid stream flows. The present invention also provides a separator comprising such an actuator. The separator of the present invention may provide the separator 5 in the CCV system 1 shown in FIG. 1 and described above. A detailed description of the separator, and of the actuator for the separator, will be provided below. However, the general structure and operating principles of the separator 5 will be described first, to facilitate understanding of the invention.

Figure 2:
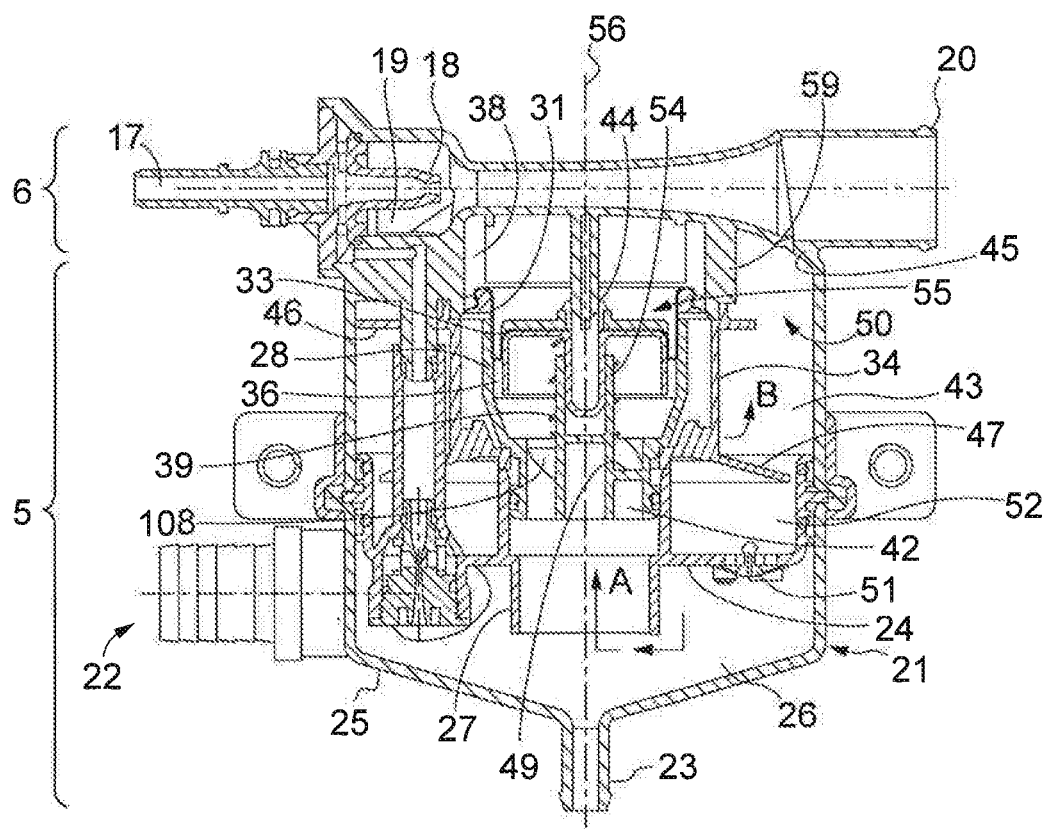
FIG. 2 is a cross-sectional side view of the CCV system shown in FIG. 1, comprising a separator having an actuator according to an embodiment of the present invention, the actuator shown in a closed (lower) position.
Figure 3:
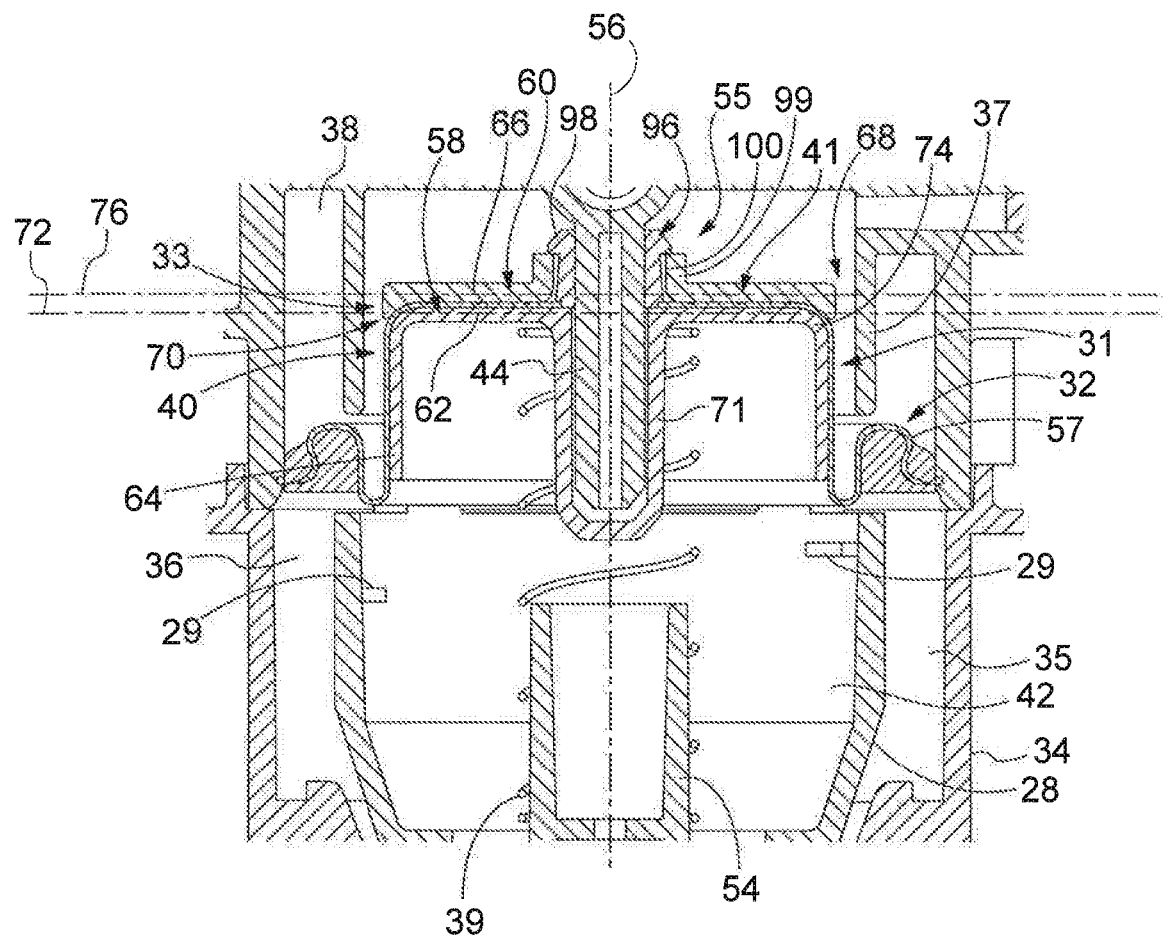
FIG. 3 is an enlarged cross-sectional view of part of the separator of FIG. 2, the actuator of the separator shown in an open (upper) position.

Referring now to FIG. 2, there is shown a cross-sectional view side of parts of a CCV system 1 including a separator 5 (an impactor separator) comprising an actuator 55 according to an embodiment of the present invention. The actuator is shown in FIG. 2 in a closed (lower) position. FIG. 3 is also referred to, which is an enlarged cross-sectional side view of part of the impactor separator 5 of FIG. 2, with the actuator 55 shown in an open (upper) position.

The CCV system 1 may be of a type which is similar to that disclosed in International Patent Publication No. WO-2014/155054 and/or International Patent Publication No. WO-2011/095790 (the disclosures of which are incorporated herein by way of reference). The CCV system 1 includes a separator 5 for separating liquid, aerosol and particulate contaminants from a blow-by gas stream. The respective portions comprising a separator 5 and a pump 6 are shown.

The separator 5 and pump 6 are combined in a single unit. The separator 5 has a housing 21 which includes an inlet 22, and an oil drain outlet 23 which returns separated oil to the engine crankcase via the oil drain 16. The separator 5 includes a cylindrical dividing wall 28 extending lengthways within the separator housing 21, the interior of which forms a first chamber 42.

The housing 21 has a mounting plate 24 provided towards a base section 25 of the housing 21 and above an oil drain outlet 23. An underside of the mounting plate 24 and base section 25 define a lower chamber 26 of the separator 5. The mounting plate 24 has a separator inlet in the form of a vortex finder tube 27 which opens into the lower chamber 26 at one open end. The vortex finder 27 includes a helical blade 108 which directs the fluid along a helical path around an axis of the vortex finder as it flows along the chamber 42. The dividing wall 28 is mounted on the other, open end of the vortex finder 27. The vortex finder 27 connects the first chamber 42 to the lower chamber 26 to define a continuous passage for the blow-by gases to flow through from inlet 22 to the first chamber 42 via the lower chamber 26 and vortex finder 27. Blow-by gases from the crankcase are directed from the crankcase into the housing 21 via the inlet 22 and into the vortex finder 27 as indicated by the arrow A in FIG. 2.

The dividing wall 28 includes at least one aperture, and in the illustrated embodiment comprises an arrangement of spaced apertures 29 which are provided towards the upper end of the dividing wall 28 remote from the separator inlet tube 27. The upper end of the dividing wall 28 is closed off by means of a flexible diaphragm arrangement (which will be described in greater detail below). The flexible diaphragm arrangement comprises a flexible diaphragm in the form of a rolling diaphragm 31, which is attached at an upper edge 30 of the dividing wall 28 by means of a sealing arrangement 32 which can be beading or an O-ring seal.

The pump 6 is mounted on the top of the housing 21 to form the single unit with the separator 5. As mentioned above, the pump 6 serves to generate a region of low gas pressure in order increase the velocity of the gases through the apertures 29 and to draw contaminated blow-by gases through separator 5. A first inlet 17 to the pump 6 receives a source of pressurised gas, referred to herein as boost gas. The boost gas is provided by the turbocharger 11 or any other source of pressurised gas such as exhaust gas. When used on a turbocharged engine the boost gas may be derived from a source of pressurised gas such as the intake manifold. Alternatively, the pressurised gas could be derived directly from the turbocharger. The first inlet 17 has a nozzle 18, formed as a convergent nozzle, such as a de Laval nozzle, which serves to accelerate the boost gas to a high velocity, for instance between 100 to 500 $m \cdot s^{-1}$, with the boost gas typically exceeding Mach 1 at least in the region of the convergent nozzle 18.

The pump 6 may take the form of the jet pump, comprising a diffuser, which forms part of a separator disclosed in the International patent application filed with the present application, with the title "JET PUMP DIFFUSER FOR A SEPARATOR", having agents' reference P223464WO/RXO. Features of the pump/diffuser, and optionally other features of the separator which are disclosed in that application, are incorporated in this application by this reference.

The first inlet 17 is connected to an upper chamber 19 of the housing 21, which, in turn, is connected to a diffuser tube 20. The diffuser tube 20 is generally formed as a cylinder. The side walls of the diffuser tube 20 are not necessarily straight for the whole of their length and may taper outwardly towards the end of the tube remote from nozzle. This tapering assists in controlling the direction of flow and mixing of the combined gas flow.

The upper end of the housing 21 has the diffuser tube 20 mounted thereon. The diffuser tube 20 includes a mounting flange 45 for mounting the diffuser tube 20 on the housing 12. A cylindrical tube 34 extends from the underside of the diffuser tube 20. The upper end of the dividing wall 28, including the rolling diaphragm arrangement, is located within the cylindrical tube 34. The internal wall of the cylindrical tube 34 and the outer wall of the dividing wall 28 define an annular space 36. The internal wall of the cylindrical tube 34 provides an impaction surface 35, the function of which will be described in further detail below. The dividing wall 28 separates the first chamber 42 from the impaction surface 35, which in this embodiment is circular.

An inner circular flange 37 is provided concentrically within the cylindrical tube 34. The rolling diaphragm 31, along with inner circular flange 37, defines a second, upper reference chamber 38. The reference chamber 38 is at atmospheric pressure via an air inlet (not shown) which connects to the outside of the CCV system 1.

The space between cylindrical tube 34 and the housing 21 defines a third chamber 43 which is connected to the upper chamber 19 in the pump 6. An annular diffuser plate 46 is provided at the upper part of the housing 21 around the cylindrical tube 34 and separates the upper chamber 19 from the third chamber 43. The annular diffuser plate 46 has a curved aperture 50 formed therein which connects the third chamber 43 to the upper chamber 19. The curved aperture 50 extends partially around the annulus of the diffuser plate 46. Clean blow-by gas, stripped of contaminants and oil, flows from the annular space 36 through the third chamber 43 and is directed up to the chamber 19 and the pump 6 through the curved aperture 50. Thus, gas flowing from the annular space 36 does not take the direct path into the upper chamber 19, but rather takes a path which is between 90° to 180° from the upper chamber 19. This is shown by the path B in FIG. 2. The gas exits the annular space 36 via ports (not shown) in the tube 34.

The rolling diaphragm 31 is supported at a central, radially extending portion 41 by a support assembly 33 which is configured to move up and down in a longitudinal direction (along an actuator axis 56) within the first chamber 42, to cause the diaphragm 31 to sequentially cover and uncover the apertures 29 provided in the upper portion of the dividing wall 28 as it moves up and down. The diaphragm 31 comprises an annular rolling portion 40, alternatively referred to as a rolling convolute, which is the portion that progressively covers and uncovers the apertures 29 as the central portion 41 moves up and down.

The flexible diaphragm 31 has a natural (or 'home') state, which is shown in FIG. 3. In the home state, the flexible diaphragm 31 has a generally 'top-hat' shape, comprising the radially extending portion 41 (which provides an inner portion of the diaphragm); a convoluted portion which extends in a first axial direction away from the radially extending portion and is then folded back on itself so that it extends in a second (opposite) axial direction to define the convolute 40; and a radially outer portion 57, which defines a lip or brim. The radially extending portion 41 of the diaphragm is seated on the lower support member 58. The radially outer portion 57 is secured to a housing portion 59 of the separator, which is coupled to the cylindrical tube 34.

A cylindrical support 54 is located concentrically with the dividing wall 28. A biasing component in the form of a regulator spring 39 is located around the cylindrical support. The cylindrical support 54 is attached by means of protrusions 49 extending outwardly of the cylindrical support 54 and connected to the internal surface of the dividing wall 28. The regulator spring 39 acts on the support assembly 33 to regulate the movement of the support assembly 33 as it moves in response to changing pressure differential. The regulator spring 39 is supported by the protrusions 49 and positioned underneath the support assembly 33. The regulator spring 39 allows the range of normal operating pressure within the crankcase to be shifted within a range of values, for example in the range plus or minus 10 mBar.

A baffle 47 is supported on the mounting plate 24. The baffle 47 is located circumferentially around the periphery of the upper portion of the vortex finder 27. The baffle 47 promotes the upward flow of air within chamber 43, and serves to direct oil separated from the blow-by gas to the oil outlet 23 via a check valve 51. Oil separated from the gas therefore flows down the baffle 47 into a sump 52 formed in the mounting plate 24, and back to the oil outlet 23 through the check valve 51, which opens when the pressure in the lower chamber 26 is the same or slightly above that in the sump 52. A number of check valves 51 can be provided although only one is shown in FIG. 2.

The separator may optionally comprise a secondary jet pump for evacuating contaminants from the chamber 43, of the type which forms part of a separator disclosed in the UK patent application filed with the present application, with the title "JET PUMP DIFFUSER FOR A SEPARATOR", having agents' reference P223464/RXO. Features of the secondary jet pump which are disclosed in that application are incorporated in this application by this reference.

In use, contaminated blow-by gas is actively drawn out of the crankcase and through the separator 5. The pressure drop across the separator 5 generated by the pump 6 overcomes the high-pressure differential of the separator 5 without causing an excessively high crankcase pressure. That is, because of the reduction in pressure caused by the pump 6, the blow-by gas may be drawn through a smaller impaction gap causing more efficient separation.

Gas is drawn into the separator inlet tube 27 generally along the path indicated by arrow A in FIG. 2 through the lower chamber 26. This section acts as a cyclonic pre-separator and the vortex finder 27 at this point defines the centre of a vortex of the gas. Liquid oil and large particles are separated from the gas at this stage and flow to the oil drain outlet 23. The blow-by gas then passes upwards through the vortex finder 27, into the first chamber 42 which is closed at its upper end by diaphragm 31. The blow-by gas passes through one or more of the apertures 29 and is incident upon the annular impaction surface 35. Oil and other contaminants separated from the blow-by gas at the impaction surface 35 flow under gravity to oil drain outlet 23 via the sloping baffle 47, sump 52 and check valve 51. Oil from the oil drain outlet 23 is returned to the crankcase.

The high-speed boost gas jet from the first inlet 17 passes into chamber 19. The high velocity boost gas jet causes a region of reduced pressure within the chamber 19 in the vicinity of the nozzle 18. Pressure is reduced by up to 250 mbar relative to external atmospheric pressure. This reduction in pressure allows cleaned blow-by gas from the separator 5 to be drawn into chamber 19 generally along the path of arrow B in FIG. 2. The blow-by gas flow is entrained and accelerated by the boost gas, intermixing with the boost gas and accelerating to approach the speed of the boost gas. A terminal velocity will be reached at the outlet of the diffuser 20 based on total flow rate.

The combined gas stream passes into a diffuser tube 20. In order to achieve satisfactory entrainment and acceleration of the blow-by gas, preferably the diameter of the diffuser tube should be between 2 to 5 times greater, preferably 3 to 4 times greater, than the critical diameter (typically, the smallest diameter) of boost gas nozzle 18. The position of the critical diameter (alternatively referred to as the throat of the nozzle) may vary from the narrowest point of the nozzle due to aerodynamic effects, as is known in the art of nozzle design.

The separator 5 may be considered to be a variable impactor separator as it is intended to respond to differences between the blow-by gas inlet pressure and the outlet pressure to increase the separation efficiency.

As mentioned above, the reference chamber 38 is kept at atmospheric pressure by an air inlet which connects to the outside of the CCV system 1. The first chamber 42 and lower chamber 26 are therefore at substantially the same pressure as the engine crankcase.

The blow-by gas passes into the annular space 36 through one or more of the apertures 29. The number of apertures 29 open will vary as the rolling diaphragm 31 rolls up and down under control of the support assembly 33 to cover and uncover the apertures 29. The size and number of apertures 29 (which may take the form of slots) determines the minimum differential pressure drop across the separator 5. As the contaminated blow-by gas travels through the apertures 29, separation of oil particles due to radial acceleration of the particles occurs. The flow of the blow-by gas is through the apertures 29 and impaction and separation of oil particles due to radial acceleration in making a 180° turn occurs both on the diaphragm 31 face and as the blow-by gas hits the impaction surface 35.

The impaction surface 35 may be covered with a material opposite the apertures 29 to reduce the tendency of oil droplets and other contaminants to bounce off the impaction surface 35. The media covering the impaction surface serves to reduce re-entrainment of the contaminants, acting as a coalescer.

The pump 6 is used to overcome the pressure drop across the separator 5. Under various engine loads, speed or engine braking conditions both the vacuum generated by the pump 6, and the volume of blow-by gas passing through the separator 5 changes. To maintain an acceptable crankcase pressure according to the variable vacuum conditions generated by the pump 6, the diaphragm 31 moves up and down to cover and uncover the apertures 29.

The pump 6 is powered with air from the engine turbo and thus creates pressure lift. The developed pressure lift is used to enhance the performance of the impactor 5. By subjecting the third chamber 43 to vacuum, the pressure in the first chamber 42 will consequentially be reduced. The rolling diaphragm 31 responds to cover or close the apertures 29, and whilst the rolling diaphragm 31 is referenced to atmosphere, the pressure in the first chamber 42 will be stabilised relative to atmosphere. Similarly, if the vacuum is reduced in the third chamber 43, the pressure in the first chamber 42 will increase and the diaphragm 31 will respond to open up the apertures 29. This relationship then maintains near atmospheric pressure in the first chamber 42 and creates a pressure drop across the impactor 5. This pressure drop is directly related to the separation efficiency of the impactor 5. When the velocity of the gas is accelerated above 100 m/s the fractional efficiency of the impactor 5 is improved.

Thus, a low flow rate through the first chamber 42 or a high vacuum in the third chamber 43 tends to close the diaphragm 31 over the apertures 29 thus decreasing the aperture open area/increasing the pressure differential across the separator 5, and thus preventing excess negative pressures in the engine crankcase. Conversely, a high flow rate through the first chamber 42 or a low vacuum in the third chamber 43 tends to cause the diaphragm to open up more of the apertures 29 thus increasing the aperture open area/ decreasing the pressure differential across the separator 5 and preventing excess positive pressures in the engine crankcase.

The pressure differential of the separator 5 is adjusted and crankcase pressure can be regulated precisely according to atmospheric pressure on the opposing side of the rolling diaphragm 31 or with the specification of the regulator spring 39 which acts on the support assembly 33. The interaction between the apertures 29 and the rolling diaphragm 31 can maintain relative atmospheric pressure control to the upstream of the impaction surface 35.

The actuator 55 of the present invention will now be described in more detail, referring particularly to FIG. 3, but also to FIG. 4, which is a view similar to FIG. 3 but with the actuator 55 shown in the closed (lower) position of FIG. 1.

The actuator 55 comprises the flexible diaphragm 31, which serves for occluding the apertures 29 as described above. The actuator 55 also comprises the support assembly 33 for the flexible diaphragm 31, which is movable along the actuator axis 56 carrying the diaphragm. The support assembly 33 comprises a lower support member 58 and an upper support member 60 which is mounted on the lower support member so that a portion 41 of the flexible diaphragm (the central portion 41) is located between the upper and lower support members.

The lower support member 58 comprises a radially extending support portion 62 and an axially extending support portion 64 coupled to the radially extending support portion. The upper support member 60 also comprises a radially extending support portion 66, and a diaphragm anti-inversion feature 68 coupled to the radially extending support portion 66. The diaphragm anti-inversion feature 68 extends in an axial direction (relative to the actuator axis 56) so that it axially overlaps part of the axially extending support portion 64 of the lower support member 58.

As discussed above, unexpected pressure increases and random high flow events can cause the diaphragm 31 to travel to its uppermost position, which is shown in FIG. 3. In this position, all of the apertures 29 in the dividing wall 28 are fully open, so that the diaphragm does not occlude any of the apertures. This presents a risk of the diaphragm 31, in particular the rolling convolute 40, being blown or turned inside out. The actuator 55 of the present invention, comprising the upper support member 60 including the diaphragm anti-inversion feature 68, acts to prevent the diaphragm 31 from inverting in the event that such unexpected pressure increases and/or high flow events are experienced. The anti-inversion feature 68 presents a physical barrier to inverting movement of the diaphragm 31, in particular its convolute 40, when in the upper position of FIG. 3. The anti-inversion feature 68 also acts to fix a natural pivot point of the diaphragm 31 (relative to the support assembly 33) to a location which is on the axially extending portion 64 of the lower support member 58, rather than at a location on the radially extending portion 62 of the lower support member. The pivot point is at an intersection 70 between the anti-inversion feature 68 and the axially extending support portion 64, as shown in FIG. 3.

The lower and upper support members 58 and 60 are provided as caps, and the support assembly 33 defines a piston which is moveable along the actuator axis 56 under applied fluid pressure, as discussed in detail above. As will be understood, the piston is formed by the lower and upper support members 58 and 60, which effectively define a hollow annular piston.

The support assembly 33 also includes a closed-ended tube 71 which is slidably mounted on a finger-like extension 44 extending from the diffuser tube 20. This arrangement serves to keep the support assembly 33 moving in the longitudinal direction.

Figure 4:
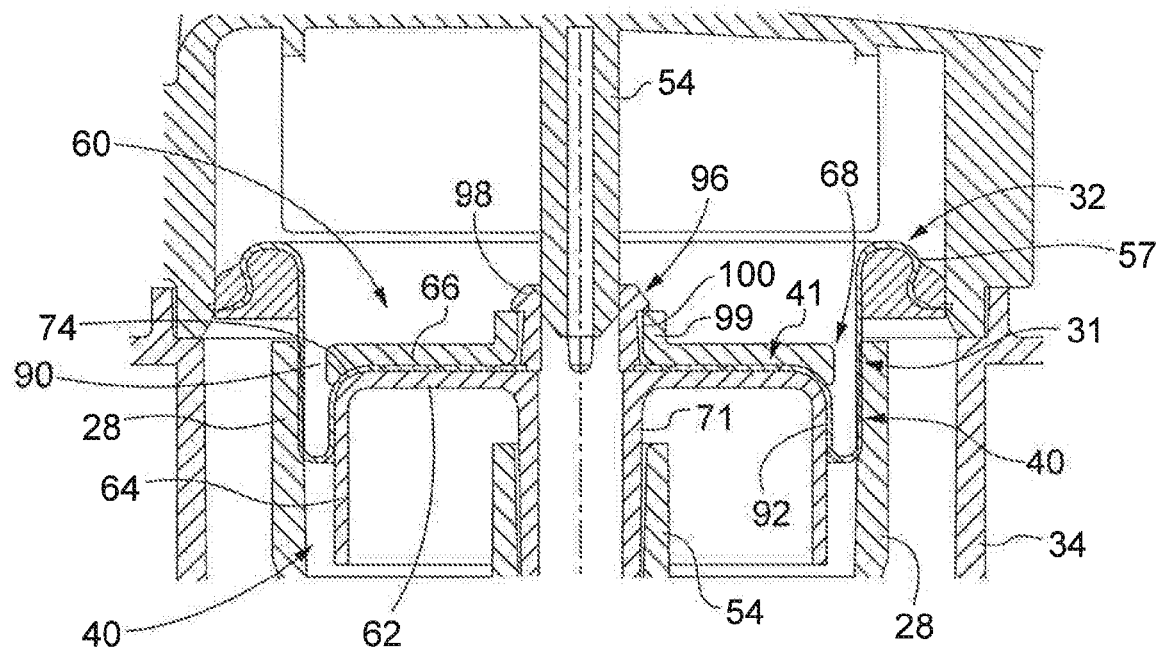
FIG. 4 is a view of the separator which is similar to FIG. 3, but with the actuator shown in the closed (lower) position of FIG. 1.

As can be seen from FIGS. 3 and 4, the lower and upper caps 58 and 60 are both provided as one-piece structures, but alternative embodiments may be formed from separate components coupled together. For example, the radially and axially extending portions 62 and 64 of the lower cap 58 may be provided as separate components.

The radially extending portion 62 of the lower cap 58 extends generally radially outwardly from the actuator axis 56. In the illustrated embodiment, the radially extending portion 62 is disposed in a plane which is parallel to a radius 72 extending from the actuator axis 56. The axially extending portion 64 extends generally axially relative to the actuator axis 56. In the illustrated embodiment, a main part of the axially extending portion 64 is disposed parallel to the actuator axis 56. The axially extending portion 64 also comprises a transition portion 74 by which it is coupled to the radially extending portion 62. The transition portion 74 has a rounded or curved profile, which provides a smooth transition between the radially and axially extending portions 62 and 64. This reduces a risk of damage to the flexible diaphragm 31 during use, as it folds and unfolds between the upper and lower positions of the actuator support assembly 33 shown in FIGS. 3 and 4.

The radially extending portion 66 of the upper cap 60 also extends generally radially outwardly from the actuator axis 56. Again, at least part of the radially extending portion 60 is disposed in a plane which is parallel to/contains a radius 76 extending from the actuator axis 56. The diaphragm anti-inversion feature 68 extends generally in an axial direction relative to the actuator axis 56, to overlap the axially extending portion 64 of the lower cap 58. This is best shown in the enlarged view of FIG. 5. The anti-inversion feature 68 extends in a generally downward direction out of a plane containing a lower surface 78 of the upper cap 60. The anti-inversion feature 68 defines a protrusion, which may take the form of a lip, rib or the like, and includes a radially inner surface 80 and a radially outer surface 82. The inner surface 80 has a rounded or curved profile which substantially matches the profile of the transition portion 74 of the lower cap 58. A radius of curvature of an outer surface 84 defined by the transition portion 74 substantially matches a radius of curvature of the transition portion inner surface 80. The outer surface 82 of the anti-inversion feature 68 extends generally parallel to the actuator axis 56, which may help to avoid damage to the diaphragm 31 during translation of the support assembly 33 along the actuator axis 56. A junction 86 between the inner surface 80 and the outer surface 82 of the anti-inversion feature 68 is also rounded or curved, to reduce a risk of damage to the diaphragm 31 during use, particularly at the intersection 70.

Figure 5:
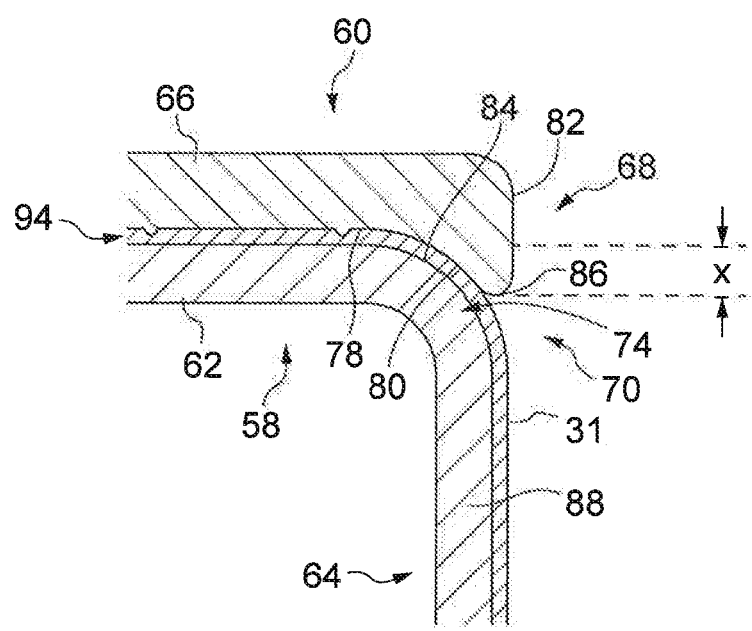
FIGS. 5 and 6 are enlarged side views of parts of the separator shown in FIG. 2.

As best shown in FIG. 5, the inner surface 80 of the anti-inversion feature 68 extends over and so covers a part of the outer surface 84 defined by the transition portion 74, so that it overlaps the axially extending portion 64 of the lower cap 58 by a distance 'x'. If desired, the anti-inversion feature 68 may cover the entire surface 84 of the transition portion 74 and may extend downwardly so that it overlaps a part 88 of the axially extending portion 64 which is disposed parallel to the actuator axis 56. As also shown in this drawing, the anti-inversion feature 68 is arranged so that it overlaps the radially outwardly extending portion 62 of the flexible diaphragm 31 in a radial direction.

Returning now to FIG. 4, the upper cap 60 describes a maximum radially outer diameter of the support assembly 33 which is less than a radially inner diameter described by the dividing wall 28. In this way, a gap 90 is defined between the dividing wall 28 and the upper cap 60, specifically between the wall and the outer surface 82 of the anti-inversion feature 68. This helps to avoid contact between the upper cap 60 and the part of the diaphragm convolute 40 which is in contact with the dividing wall 28, during translation of the support assembly 33.

As can be seen from both FIGS. 3 and 4, the axially extending portion 64 of the lower cap 58 is arranged to support a lower or inner surface 92 of the diaphragm 31 as the support assembly 33 moves along the actuator axis 56. This helps to maintain the convolute 40 and also to resist diaphragm inversion.

The lower surface 78 of the upper cap 60 forms a diaphragm support surface, and the lower cap 58 defines a corresponding diaphragm support surface 94. The central portion 41 of the diaphragm 31 is located between these support surfaces 78 and 94 and is sealed relative to the surfaces (sealing being by contact between the material of the diaphragm and the support surfaces). A clamping force is imparted upon the central diaphragm portion 41, suitably by a connector 96 which exerts a clamping force on the upper cap 60 to secure it to the lower cap 58. The connector 96 may be formed integrally with the lower cap 58, for example by providing the connector as a collet comprising resilient fingers including enlarged ends or heads 98. The ends 98 may be dimensioned so that the upper cap 60 is press-fitted to the lower cap 58. This may be achieved by providing the upper cap 60 with a hollow mounting boss 99 defining a central aperture 100 which is shaped to fit over the collet 96 fingers in a push-fit, deflecting the fingers radially inwardly until such time as the upper cap 60 has moved to the position shown in FIG. 3, at which point the enlarged ends 98 of the collet fingers snap radially outwardly to engage an upper end of the boss 99, to impart the clamping force on the diaphragm 31.

Figure 6:
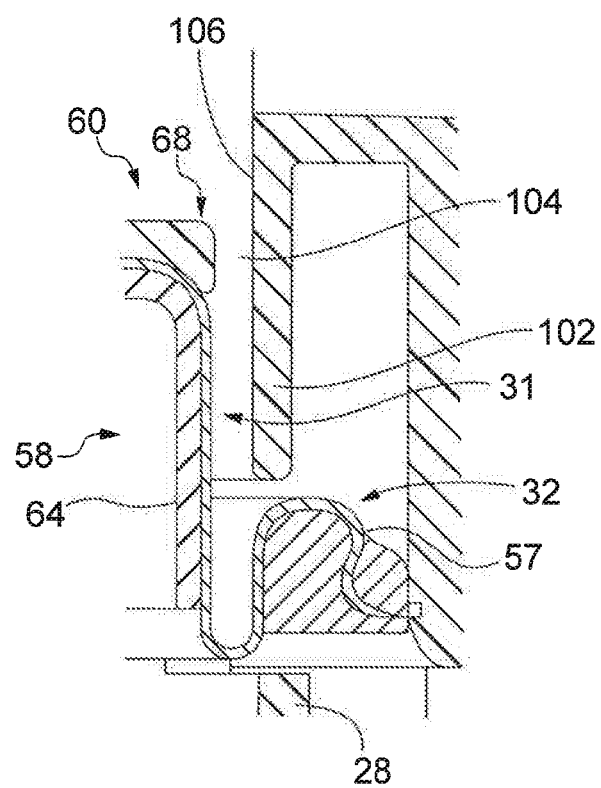

FIG. 6 is an enlarged view of a part of the separator 5 shown in FIG. 3, showing a diaphragm anti-inversion member 102. The anti-inversion member 102 is located radially outwardly of the actuator 55 and extends in direction along the actuator axis 56. The anti-inversion member 102 defines a barrier for resisting inversion of the flexible diaphragm 31, particularly when it is in the upper position of FIG. 3. The anti-inversion member 102 is disposed in the chamber 38 which references atmospheric pressure and limits the space available for the diaphragm 31 to invert into the second chamber 38, and/or to balloon out. The anti-inversion member 102 describes a radially inner diameter which is greater than the radially outer diameter defined by the upper cap 60, so that a gap 104 is defined between the anti-inversion member and the upper support member. This helps to avoid contact between the upper support member 60 and the anti-inversion member 102 during movement of the support assembly 33.

The anti-inversion member 102 is generally radially aligned with the dividing wall 28 of the actuator 55, so that it is located generally axially above the dividing wall. The anti-inversion member 102 defines a barrier surface 106 facing towards the diaphragm 31, which restricts inversion. The barrier surface 106 is substantially continuous, extending around a circumference of the support assembly 33, suitably around the entire circumference. The anti-inversion member 102 is generally annular in shape, typically being of a cylindrical tubular shape, and taking the form of a rib.

The actuator 5 of the present invention, and the separator 55 incorporating the actuator, provides efficient separation performance whilst reducing a risk of the diaphragm 31 inverting, particularly when the support assembly 33 of the actuator is in an upper position and an unexpected pressure increases or random high flow event occurs.

Various modifications may be made to the foregoing without departing from the spirit or scope of the present invention.

For example, the separator may comprise a plurality of anti-inversion members which together define a barrier surface. The anti-inversion members may take the form of fingers or other protrusions.

The lower and upper support members will typically be provided as separate components. However, the support members can conceivably be provided as a single component, for example by a suitable moulding process.

Although the invention is described with reference to a closed or open crankcase ventilator system, the invention can also be applied to a crankcase ventilator with a downstream pump system to increase separation efficiency, or to any system that requires oil aerosol separation.

What is claimed is:

1. An actuator for a separator for separating contaminants from a fluid stream which includes entrained contaminants, the actuator being arranged to move along an actuator axis to adjust an open cross-sectional area of at least one aperture of the separator through which the fluid stream flows and comprising:
a flexible diaphragm for occluding the at least one aperture; and
a support assembly for the flexible diaphragm, the support assembly being movable along the actuator axis carrying the flexible diaphragm and comprising a lower support member and an upper support member mounted on the lower support member so that a portion of the flexible diaphragm is located between the upper and lower support members;
in which the lower support member comprises:
a radially extending support portion which extends radially outwardly from the actuator axis and which is disposed in a plane that is parallel to a radius of the actuator axis; and
an axially extending support portion comprising a part which is disposed substantially parallel to the actuator axis and a transition portion by which the axially extending support portion is coupled to the radially extending support portion, the transition portion having an outer surface which is rounded so that the transition portion has a rounded profile;
and in which the upper support member comprises:
a radially extending support portion which extends radially outwardly from the actuator axis and which is disposed in a plane that is parallel to a radius of the actuator axis; and
a diaphragm anti-inversion feature coupled to the radially extending support portion and comprising a radially inner surface having a rounded profile which matches the rounded profile of the transition portion, and a radially outer surface which is disposed substantially parallel to the actuator axis, a transition forming an intersection between the radially inner and outer surfaces having a rounded profile, the diaphragm anti-inversion feature extending in an axial direction so that the inner surface of the anti-inversion feature extends over and covers a part of the outer surface of the transition portion.

2. An actuator as claimed in claim 1, in which the lower support member takes the form of a lower cap, the upper support member takes the form of an upper cap, and the support assembly defines a piston which is movable along the actuator axis under applied fluid pressure.

3. An actuator as claimed in claim 1, in which the radially extending portion of the lower support member is disposed substantially perpendicularly to the actuator axis.

4. An actuator as claimed in claim 1, in which the radially extending portion of the upper support member is disposed substantially perpendicularly to the actuator axis.

5. An actuator as claimed in claim 1, in which the diaphragm anti-inversion feature extends in the axial direction out of the plane in which the radially extending portion of the upper support member is disposed.

6. An actuator as claimed in claim 1, in which the diaphragm anti-inversion feature extends in an axial direction towards the lower support member.

7. An actuator as claimed in claim 1, in which a radius of curvature of the inner surface of the diaphragm anti-inversion feature is the same as a radius of curvature of the transition portion.

8. An actuator as claimed in claim 1, in which the diaphragm anti-inversion feature defines a radially outer extent of the upper support member.

9. An actuator as claimed in claim 1, in which the diaphragm anti-inversion feature is arranged so that the diaphragm anti-inversion feature overlaps a radially outwardly extending portion of the flexible diaphragm in a radial direction.

10. An actuator as claimed in claim 1, in which the upper support member is mounted on the lower support member by a connector which is arranged to exert a clamping force on the upper support member to secure it to the lower support member.

11. A separator for separating contaminants from a fluid stream which includes entrained contaminants, comprising:
a chamber having an inlet through which a fluid stream enters the chamber, to flow axially along the chamber;
an impaction surface located downstream of the chamber, which is arranged to deflect the fluid stream after the fluid stream leaves the chamber such that contaminants are separated from the fluid stream;
a dividing wall which separates the chamber from the impaction surface, the dividing wall having at least one aperture formed in it through which the fluid stream can pass out of the chamber towards the impaction surface; and
an actuator according to claim 1, in which the actuator is arranged to move along the actuator axis to adjust the open cross-sectional area of the at least one aperture in the dividing wall according to a pressure differential between fluid pressure in the chamber and a pressure reference by moving along the dividing wall so as progressively to occlude the at least one aperture.

12. A separator as claimed in claim 11, in which the separator comprises a diaphragm anti-inversion member located radially outwardly of the actuator and extending in direction along the actuator axis, to define a barrier for resisting inversion of the flexible diaphragm.

13. A separator as claimed in claim 12, in which the diaphragm anti-inversion member describes a radially inner diameter, and in which the upper support member describes a radially outer diameter of the support assembly which is less than the radially inner diameter of the diaphragm anti-inversion member, so that a gap is defined between the diaphragm anti-inversion member and the upper support member.

14. A separator as claimed in claim 11, in which the separator comprises a diaphragm anti-inversion member which defines a substantially continuous barrier surface facing towards the flexible diaphragm and extending around a perimeter of the actuator assembly.

15. An actuator for a separator for separating contaminants from a fluid stream which includes entrained contaminants, the actuator being arranged to move along an actuator axis to adjust an open cross-sectional area of at least one aperture of the separator through which the fluid stream flows and comprising:
   a flexible diaphragm for occluding the at least one aperture; and
   a support assembly for the flexible diaphragm, the support assembly being movable along the actuator axis carrying the flexible diaphragm and comprising an inner support member and an outer support member mounted on the inner support member so that a portion of the flexible diaphragm is located between the inner and outer support members;
   in which the inner support member comprises:
   a radially extending support portion which extends radially outwardly from the actuator axis and which is disposed in a plane that is parallel to a radius of the actuator axis; and
   an axially extending support portion comprising a part which is disposed substantially parallel to the actuator axis and a transition portion by which the axially extending support portion is coupled to the radially extending support portion, the transition portion having an outer surface which is rounded so that the transition portion has a rounded profile;
   and in which the outer support member comprises:
   a radially extending support portion which extends radially outwardly from the actuator axis and which is disposed in a plane that is parallel to a radius of the actuator axis; and
   a diaphragm anti-inversion feature coupled to the radially extending support portion and comprising a radially inner surface having a rounded profile which matches the rounded profile of the transition portion, and a radially outer surface which is disposed substantially parallel to the actuator axis, a transition forming an intersection between the radially inner and outer surfaces having a rounded profile, the diaphragm anti-inversion feature extending in an axial direction so that the inner surface of the anti-inversion feature extends over and covers a part of the outer surface of the transition portion.

* * * * *